United States Patent [19]

Dockray et al.

[11] 4,074,960
[45] Feb. 21, 1978

[54] MANUFACTURE OF POLYMERIC FOAM

[75] Inventors: Edward Dockray, Holcombe Brook; Denis Killen, New Mills, both of England

[73] Assignee: Unifoam A.G., Glarus, Switzerland

[21] Appl. No.: 737,402

[22] Filed: Nov. 1, 1976

[30] Foreign Application Priority Data

Nov. 7, 1975 United Kingdom ............... 46274/75

[51] Int. Cl.² .............................................. B29D 27/00
[52] U.S. Cl. ..................................... 425/89; 425/224; 425/329; 425/817 C
[58] Field of Search .................. 425/4 C, 817 C, 115, 425/224, 329, 371, 471, 89; 264/46.2, 51, 46.3

[56] References Cited

U.S. PATENT DOCUMENTS 3,832,099  8/1974  Berg ............................ 425/817 C X
3,984,195  10/1976  Del Carpio ................. 425/817 C X Primary Examiner—Francis S. Husar
Assistant Examiner—Mark Rosenbaum
Attorney, Agent, or Firm—Lawrence E. Laubscher

[57] ABSTRACT

An apparatus for the production of a continuous length of polymeric foam from a liquid foam mix comprising an open-topped trough to the bottom of which the liquid foam mix is supplied to expand upwardly therein, until it flows therefrom over a weir structure associated with said trough into an open-topped channel shaped conveyor associated with said weir structure and arranged continuously to convey expanding foam away from the weir structure while it completes its expansion process, the open-topped channel shaped conveyor comprising a bottom wall and separate side walls which join said bottom wall downstream of the weir structure, the apparatus also including means operable to alter the length of the trough, and conveyor width adjustment means operable to alter the width of the bottom wall of the channel shaped conveyor and to move its said walls correspondingly in synchronism with width alterations of said bottom wall and sealing means for maintaining a seal where the side walls meet the bottom wall of the channel shaped conveyor during width changes whereby foam of varying widths may be produced without stopping the production run. In a preferred embodiment, the bottom wall is a single sheet of material formed with upstanding edge regions before said sheet joins up with the side walls to provide the moving open-topped conveyor, the or each upstanding edge region being folded down during width change operations to increase the width of the trough while still maintaining the required seal.

21 Claims, 11 Drawing Figures

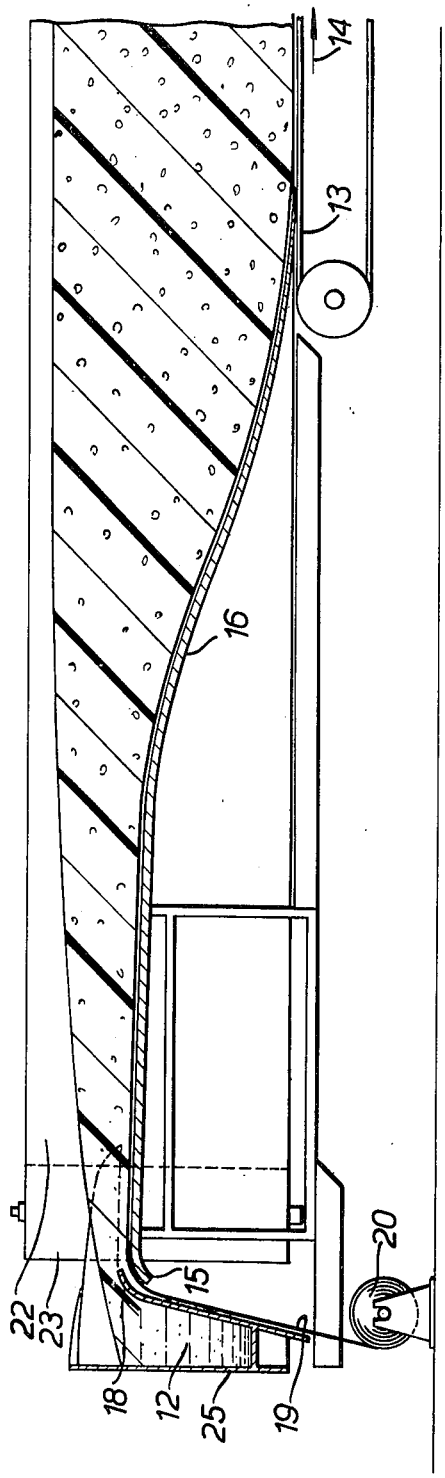
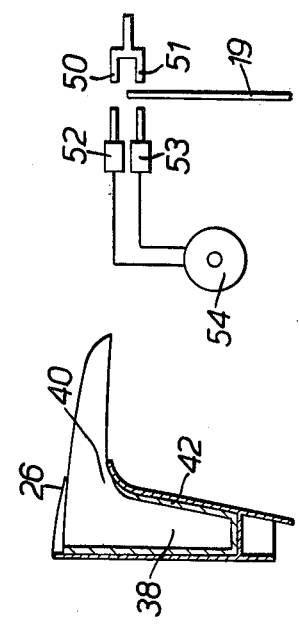
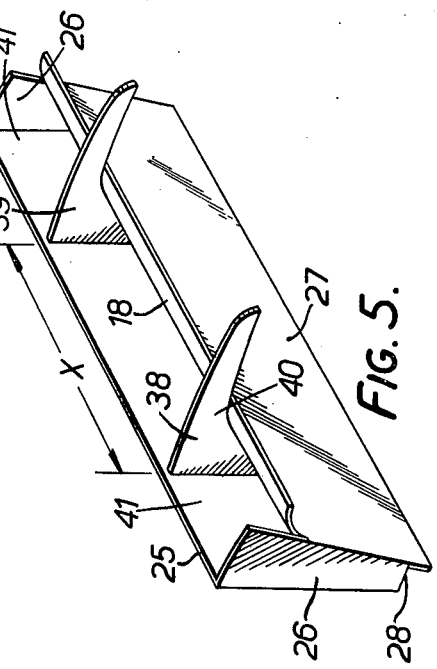

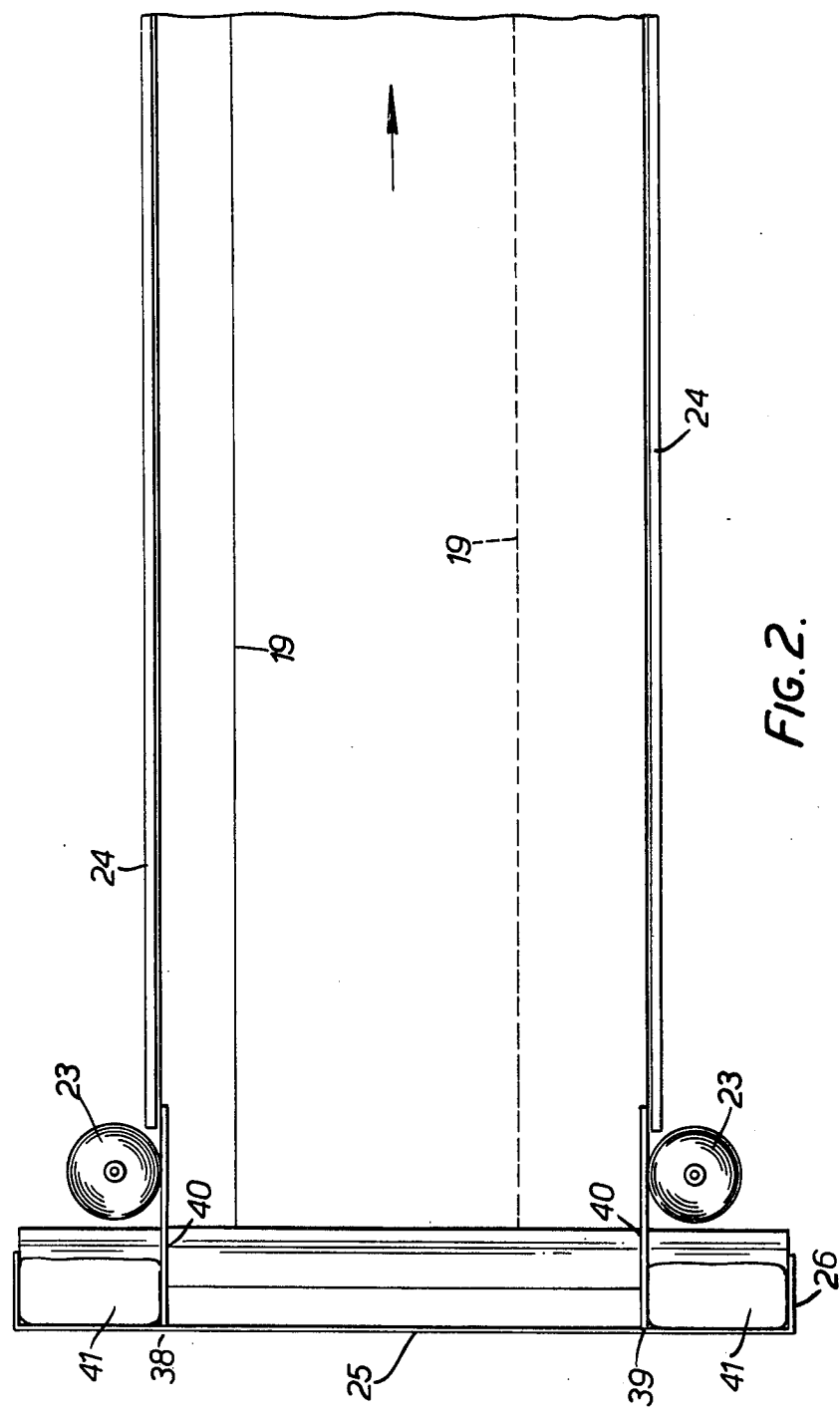

MANUFACTURE OF POLYMERIC FOAM

BRIEF DESCRIPTION OF THE PRIOR ART

This invention relates to the continuous production of polymeric foam strands e.g. continuous strands of polyurethane foam.

In the prior U.S. Pat. to Berg. No. 3,786,122 — which is assigned to the same assignee as the instant invention a method of producing a continuous strand of polymeric foam is described in which a mixture of liquid foam reactants is continuously supplied to the bottom of a vessel and allowed to expand upwardly therein due to the chemical reaction between the reactants, but prior to completion of the expansion process, partially expanded foam is allowed to flow from the vessel over a weir structure and thereafter is allowed to complete its expansion process in a channel shaped conveyor in which the foam is continuously moved away from the weir structure. The said patent also describes apparatus for carrying out the process just described.

The vessel is usually in the form of a trough of predetermined dimensions, the length of which corresponds to the width of the foam strand to be produced. Thus the width of the foam strand produced using the apparatus just described is governed by the length of the trough and the width of the channel shaped conveyor in which the expansion process is completed. If the width of the foam strand produced has to be changed, the trough must be replaced with another one of the appropriate length and the width of the channel shaped conveyor must be altered accordingly.

The Berg U.S. Pat. No. 3,832,099 — also assigned to the same assignee as the instant invention also describes an apparatus in which, after the partially expanded foam has flowed over the weir structure, it moves down an inclined surface or pour plate during completion of foam expansion. Thus, if a foam strand of a different width is to be produced on this modified apparatus, the pour plate must also be replaced with a new one of the correct width in addition to replacing the trough and resetting the width of the channel shaped conveyor.

SUMMARY OF THE INVENTION

It is therefore an object of the invention to provide an apparatus of the kind described and claimed in the aforementioned Berg U.S. patents in which width adjustments can be made to the foam being produced without stopping the production run.

According to the invention there is provided an apparatus for the production of a continuous length of polymeric foam from a mixture of liquid foam reactants, comprising an open-topped trough in which the liquid foam may expand upwardly, means for supplying liquid foam reactants to the bottom of said trough, a weir structure associated with said trough so that foam rising by expansion therein will flow over said weir structure, an open-topped channel shaped conveyor associated with said weir structure and arranged continuously to convey expanding foam away from the weir structure while it completes its expansion process, the open-topped channel shaped conveyor comprising a bottom wall and separate side walls which join said bottom wall downstream of the weir structure, the apparatus also including means operable to alter the length of the trough, and conveyor width adjustment means operable to alter the width of the bottom wall of the channel shaped conveyor and to move its side walls correspondingly in synchronism with width alterations of said bottom wall and sealing means for maintaining a seal where the side walls meet the bottom wall of the channel shaped conveyor during width changes whereby foam of varying widths may be produced without stopping the production run.

The bottom wall of the channel shaped conveyor may comprise a pair of overlapping sheets but preferably the bottom wall is a single sheet, folding means being provided for forming an upstanding lip on each edge of the bottom sheet as it travels from the weir structure to a point downstream thereof where separate side sheets sealingly join up with the bottom sheet to provide said open-topped channel shaped conveyor, the conveyor width adjustment means being operable to increase the width of the channel shaped conveyor whereby the side sheets are moved outwardly and the or each bottom sheet upturned lip is folded down to increase the width of the bottom of the channel shaped conveyor and maintain the seal between said bottom sheet and the side sheets during width change operations.

Conveniently, the length of the trough is greater than the maximum width of the foam to be produced by the apparatus, said means operable to vary the length of the trough comprising a pair of movable partitions having a nose portion which extends beyond the weir structure downstream of the trough. In a preferred construction, each nose portion terminates upstream of the point where the side sheets join the bottom sheet. It is not essential that they extend all the way to where the side sheets meet the bottom sheet because the partially expanded foam leaving the trough over the weir tends to fan out when it reaches the ends of the nose portions of the partitions while still moving forwardly with the result that it does not actually reach the edges of the bottom sheet until the side sheets have joined up with it to form the channel shaped conveyor.

The bottom of the channel shaped conveyor may be supported on a horizontal conveyor whose conveying reach moves in a direction away from the weir structure. In a preferred construction, a downwardly inclined pour plate extends between the weir structure and the horizontal conveyor, the bottom sheet being supported by and moving down the pour plate prior to reaching the horizontal conveyor, the pour plate comprising a fixed central section and edge portions movable laterally with respect thereto, each edge portion being supported on its own respective movable carriage. In a preferred embodiment the bottom sheet is fed from a supply roll which is mounted on a carriage movable laterally with respect to the trough, said carriage being operably connected to one of said pour plate carriages so as to move laterally in synchronism therewith.

Preferably, the or each bottom sheet is paper, which may be coated with a layer of plastics material to reduce absorption and the side sheets are thin polyethylene. However, the or each bottom sheet may be polyethylene although in the embodiment utilizing a pour plate, some form of drive system to assist its passage over the pour plate would be needed. For instance the pour plate would need to be made up from a plurality of rollers or one or more moving conveyors.

BRIEF DESCRIPTION OF THE DRAWING

Preferred embodiments of the invention will now be described, by way of example only, with reference to the accompanying schematic drawings, in which:

FIG. 1 is a cross-sectional elevation of an apparatus of the invention but with various adjustment details omitted;

FIG. 2 is a plan view of the apparatus of FIG. 1 but with some features omitted;

FIG. 5 is a perspective view of the vessel of FIGS. 1 and 2;

FIG. 6 is a cross-section through the vessel of FIG. 5;

FIG. 7 is a schematic plan view of an automatic edge guide means;

DETAILED DESCRIPTION

Figure 3:
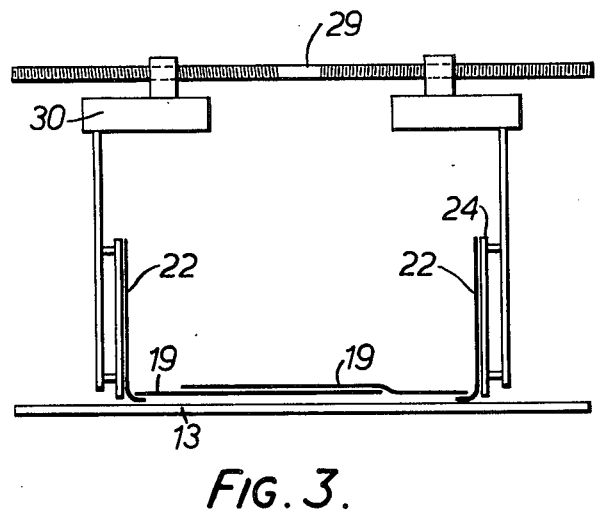
FIG. 3 is a cross-sectional view of part of the apparatus of FIG. 1 but including various adjustment features.

Referring to the drawings, there is shown an apparatus comprising a vessel in the form of a trough 12 and a conveyor 13 which has its conveying reach arranged to move horizontally in the direction of arrow 14, over a stationary supporting platform. An inclined pour plate 16 is arranged between the conveyor 13 and the trough 12. The trough 12 is provided with a lip 18 which constitutes a weir structure for the trough 12, said lip being spaced just above the pour plate 16. End portion 15 of the pour plate 16 immediately adjacent the lip 18 is bent downwardly with respect to the lip as shown in the drawings to act as a guide for the bottom of a moving channel shaped conveyor, in this case two overlapping sheets or webs of material 19, for example kraft paper, fed from respective supply rolls 20 upwardly between the lip 18 and said downturned end portion 15 of the pour plate 16. The sheets then continue over and down the pour plate 16, and on to the conveying reach of the conveyor 13 to move thereafter with said conveyor.

The side walls of the moving open topped channel shaped conveyor are provided by side sheets 22 of kraft paper or polyethylene which are fed from respective supply rolls 23 located a short distance downstream of the lip 18 to join up with the free outer edges of the bottom sheets 19. These side sheets 22 are then driven in the conveying direction of arrow 14 at the same speed as the conveyor 13.

The trough 12 comprises an upright rear wall 25 and side walls 26 of similar height. The front wall 27 of the trough is inclined to rise from a base 28 of the trough to the trough lip 18. The lower part of the trough can be divided into sections by baffle plates, and each section may be fed so that each trough section receives mixture from the mixing head which is the same age (i.e. has travelled the same distance) as that received by all the other sections. If desired, the baffle plates can extend along the length of the trough, the plates being spaced from each other across the trough width.

Liquid foam reactants can be supplied from a mixing head through pipes connected to the bottom of the trough or alternatively, the reactants are fed to the trough pipes which enter from above the trough and extend downwardly against the rear wall 25 of the trough towards the trough bottom. The mixing head and supply means for the reactants are not shown in order to avoid unnecessary complication of the drawings.

In operation, chemical reactants suitable for producing polymeric foam and known per se are fed to the mixing head (not shown). The mixture of reactants is then supplied to the trough 12 from the mixing head through piping (not shown). The mixture of reactants is initially liquid as it arrives in the trough but, as the liquid level rises, the mixture begins to expand and foam in manner known per se, due to chemical reaction. The expanding foam rises upwardly in the trough, until it reaches the lip 18 constituting the weir structure over which it flows out of the trough 12 into contact with the moving sheets 19, and down over the pour plate 16. The foam is in a condition in which it is changing from a mainly liquid to a mainly solid state as it flows over the weir structure 18. As the foam expands and rises in the trough 12 so fresh liquid mixture is supplied to the bottom of the trough. Thus a constant flow of solidifying or partially expanded foam passes over the weir 18 and moves down the inclined pour plate 16. The angle of inclination of the pour plate 16 to the horizontal is chosen such that when the foam reaches the bottom thereof, expansion or foaming has substantially ceased and the expanded foam with a horizontal top surface continues horizontally along the conveyor while foam curing takes place.

By the time the expanding foam in the trough 12 reaches the weir 18 it should have acquired a sufficient viscosity that it does not seep past the join between the outer edges of the bottom sheets 19 and the side sheets 22. However, in case it has not, sealing means 57 to be described in more detail shortly are preferably provided along the side edges of the pour plate to fill in the gap between said side edges and the side sheets 22. Furthermore, as the foam passes over the weir 18, the viscosity is such that the foam moves downwardly with the sheets 19 and exhibits negligible tendency to flow in advance of the sheet 19. In order to vary the width of the foam strand produced, the length of the trough 12 and the width of the pour plate 16 and channel shaped conveyor are arranged to be adjustable as will be described in more detail hereafter.

For foam strands to be made to different widths, the primary requirement is that the width of the moving channel shaped conveyor must be adjustable because it is in said channel shaped conveyor where foaming is completed and the strand is formed. In the apparatus illustrated, this is achieved (as on conventional machines) by suspending the side walls 24 on slides 30 (see FIGS. 3 and 4) which are movable by screws 29 all mechanically connected together.

Having set the rigid side walls 24 to the required width, the width of the bottom sheets 19 of the channel shaped conveyor must also be altered. This is allowed for as shown in FIG. 3 by making the bottom of the channel shaped conveyor from the two separate webs supplied from the rolls 20, the webs overlapping and the width of each web being greater than half the maximum width to be covered.

Figure 4:
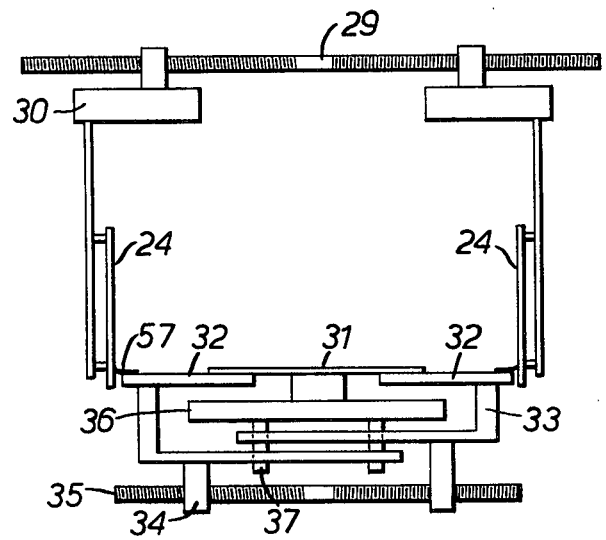
FIG. 4 is a cross-sectional view of another part of the apparatus of FIG. 1 but including various adjustment features.

Having set the channel shaped conveyor to the required width, the width of the pour plate 16 must also be adjusted to the corresponding width. One arrangement for doing this is illustrated in FIG. 4 and comprises a fixed centre section 31 which may be of wood, metal, synthetic plastic laminate or other synthetic material, this centre section overlying two movable outer portions 32 attached to support members 33. Each support member has a lug 34 having a threaded hole through which a threaded shaft 35 passes. The fixing centre section 31 is supported on a support frame 36 carrying guides 37 which pass through a slot in each of the support members 33. As can be seen from FIG. 4 of the drawings, rotation of the threaded shaft 35 causes the movable outer portions 32 to move either towards or away from the fixed centre section 31.

As already explained, it is preferable to seal the gap between the side edges of the pour plate 16 and the vertical side sheets 22 which, in operation, are passing said edges, so special sealing means are attached to the side edges of the fall plate 16 to prevent any partially expanded foam seeping out of the channel shaped conveyor through the gap between the side sheets 22 and the side edges of the pour plate 16. A strip 57 of fabric treated with polytetrafluoroethylene is used for this purpose and attached to each side of the pour plate 16 so that it overlaps and contacts each side sheet 22 to fill the gap therebetween. These strips 57 do not impede the easy movement of the side sheets 22 past the side edges of the pour plate 16.

The mechanism for moving the outer portions 31 of the pour plate 16 are preferably connected with the mechanism for moving the rigid side walls 24 so that the pour plate 16 and side wall 24 can be adjusted in synchronism. This also ensures that the sealing of the gaps between the pour plate 16 and the side walls 24, which is a critical adjustment, can be kept constant during resetting of the apparatus to produce a foam strand of different width.

The final part of the apparatus which requires to be adjustable is the trough 12. As can be more clearly seen in FIGS. 5 and 6, the trough 12 is provided with two spaced vertical partitions 38 and 39 which are movable by means not shown along the length of the trough. Each partition is provided with a nose portion 40 which overhangs and extends beyond the lip or weir structure 18. This ensures that partially expanded foam leaving the trough over the weir 18 cannot reach the lateral edges of the bottom sheets 19 until the side sheets 22 have joined up with the bottom sheets to form the moving channel shaped conveyor, which it will be noted does not occur until some way downstream of the trough lip 18. When the partitions are set to the width of foam strand to be produced, they are positioned relative to the channel shaped conveyor and the rigid side walls 24 as shown in FIG. 2, the outside face of each nose portion 40 being substantially coplanar with the inside face of the side sheets 22 fed from the supply rolls 23 positioned immediately adjacent and behind the nose portions 40.

As liquid foam reactants are pumped into the bottom of the trough 12 and are allowed to expand upwardly therein, some form of seal must be provided to prevent liquid foam reactants or partially expanded foam from entering spaces 41 behind each partition. An inflatable seal 42 can be fitted round each partition as shown in FIG. 6 between the walls of the trough and the edges of each partition in contact with those walls. However, other sealing arrangements may be used.

The partitions can be manually positioned in the trough, each time the width of foam strand to be produced is changed, the spacing between the partitions being such that the partially expanded foam which flows out of the trough into the channel shaped conveyor is at substantially the correct desired width. The partitions 38, 39 may, however, be arranged to be slidable from side to side within the trough 12 by mechanical means.

It should be clear that the effective volume of the trough to which the liquid foam reactants are supplied and from which partially expanded foam flows over the weir structure 18, is that between the partitions 38, 39. For this reason, when the specification refers to the length of the trough 12 being altered depending on the width of foam strand to be produced, the length of the trough in this case is the distance X between the partitions 38, 39.

The actual length of the trough 12 between its side walls 26 is the same as the maximum width of foam to be produced by the apparatus.

The mechanical means for moving the partitions are preferably connected in synchronism with the means for adjusting the width of the pour plate 16 and side walls 24. If the partitions are to be movable along the length of the trough, i.e. laterally with respect to the moving channel shaped conveyor, the cross section of the trough should preferably be constant if an effective seal is to be provided between the partitions and the trough walls. In order to assist any such seal, spaces 41 can be filled with a block of polyurethane foam of low density so that on adjustment of the partitions 38, 39 the volume of each space 41 will be completely filled at all times by said block of foam and thereby the entry of the liquid foam reactants or partially expanded foam round the seal between the partitions would be prevented when the partitions are adjusted to a new position, the block of foam in each space 41 will expand or be compressed to maintain the volume of spaces 41 fully filled. An alternative to this arrangement would be to fill each space 41 with an inflatable bag or balloon which would serve the same purpose.

As an alternative to the arrangement just described for adjusting the length of the trough 12, the trough may be made of two or three sections which slide relative to each other in telescopic manner, a seal being provided in the gap between any two telescoping sections to prevent the exit of liquid foam reactants or partially expanded foam from the trough. The various sections can be moved to adjust the length of the trough by mechanical means which can be synchronized with the adjusting means for altering the width of the channel shaped conveyor and the pour plate 16.

It will be appreciated that as the width of the pour plate 16 is altered, the degree of overlap of the bottom sheets 19 will also be altered by a corresponding amount, the outer edges of each of said sheets being coterminous with the outer edges of the pour plate 16. In order to accommodate any distortion of the bottom sheets 19 during adjustment, they can be sheets of polyethylene.

Preferably, automatic edge guide means are provided for ensuring that both bottom webs 19 follow the desired path after the width of the apparatus has been reset.

These edge guide means are preferably located on the path of the sheet 19 as they travel from the supply rolls 20 to the lip 18 of the trough. One such guide means is provided for each web 19 and each guide means is located as close as possible to said lip.

Conveniently each guide means comprises a mechanism as shown in FIG. 7. For ease of explanation, the guide means for one of the sheets 19 will be described. As can be seen from FIG. 7, the automatic edge guide means includes a pair of air ports 50 and 51 connected to an air supply. When the bottom web 19 is correctly located, its outer edge covers the port 51 but does not cover the port 50. In this condition, air actuated switches 52 and 53 connected in the energization circuit of motor 54 are open and the motor is stationary. If the sheet 19 drifts laterally with respect to the direction of movement of the channel shaped conveyor, the air supply to switch 52 is cut off and the switch operates to drive the motor 54 in a clockwise direction. This causes, by means not shown, a corrective alteration in the orientation of the axes of rotation of the supply roll 20 from which the sheet 19 is being fed. The sheet 19 is thus moved laterally in the opposite direction and returns to its normal position. If the sheet 19 drifts laterally sufficiently to uncover port 50, air is supplied to switch 53 which operates to drive the motor 54 in a counterclockwise direction and the sheet 19 is thereby returned to its normal position.

Preferably the automatic edge guide means just described are adjustable in synchronism with the adjustments made to the channel shaped conveyor, trough 12 and pour plate 16.

Figure 8:
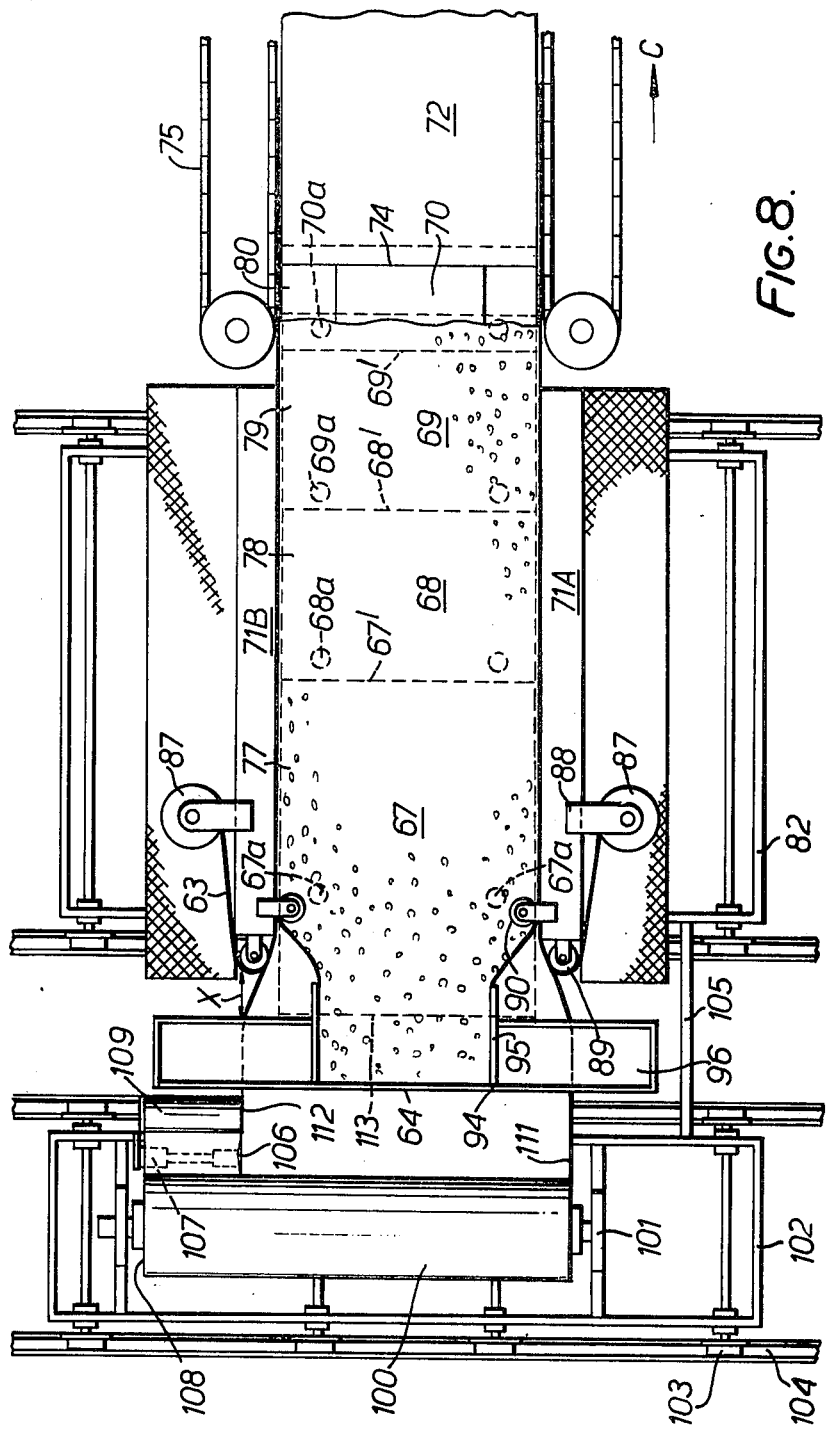
FIG. 8 is a schematic plan view of another apparatus of the invention.
Figure 9:
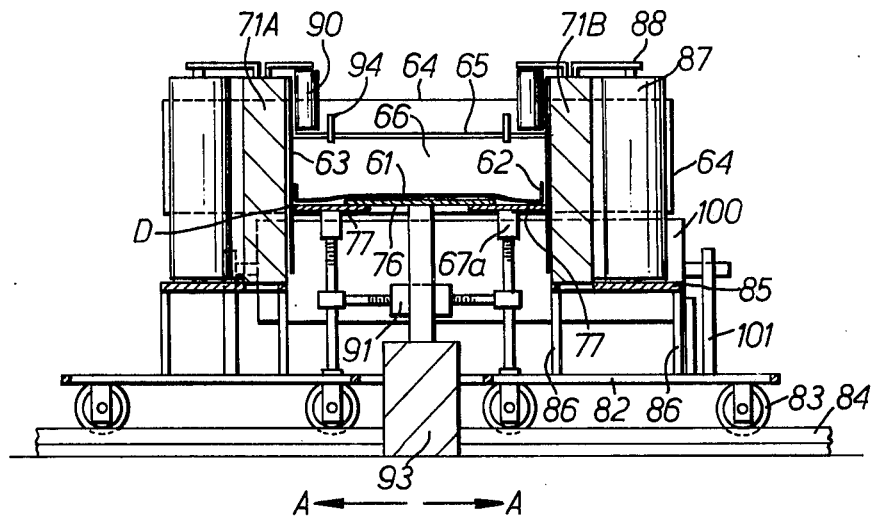
FIG. 9 is a cross-section through the apparatus of FIG. 8 along the line IX—IX but with some features omitted.
Figure 11:
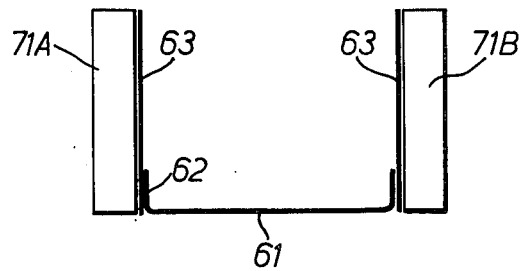
FIG. 11 is a diagrammatic cross section showing the sheet system used to form the moving channel shaped conveyor of FIGS. 8 to 10.
Figure 10:
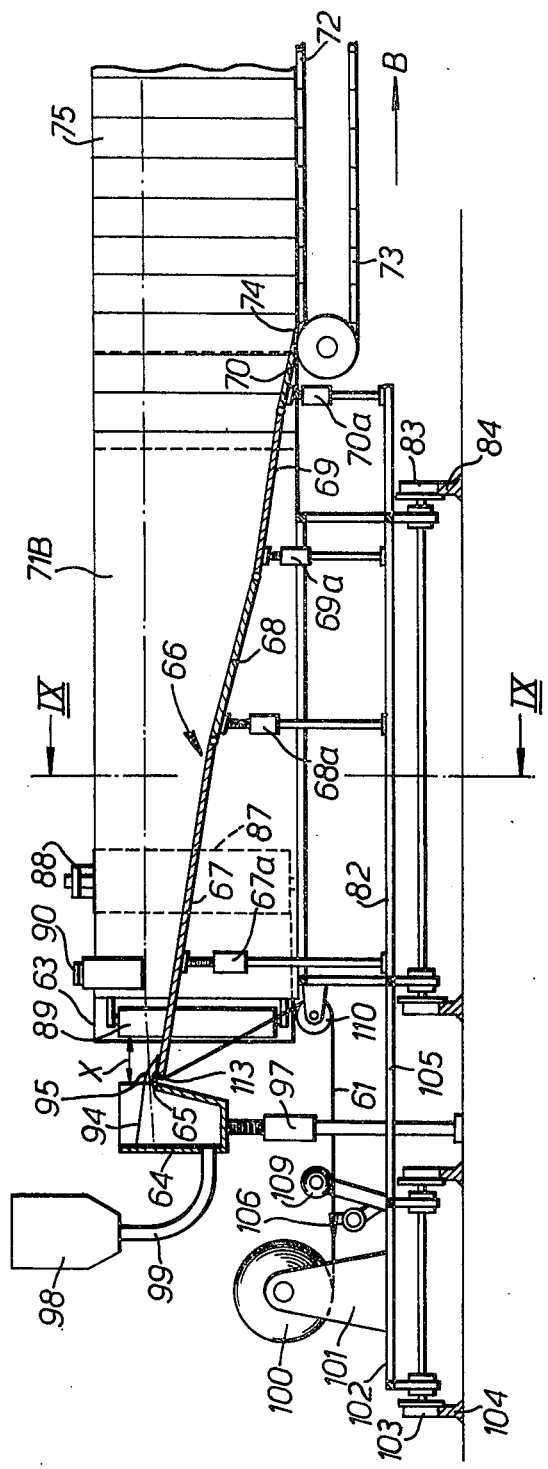
FIG. 10 is a schematic side elevation in cross-section of the apparatus of FIG. 8.

The embodiment illustrated in FIGS. 8 to 10 is very similar to that just described with reference to FIGS. 1 to 7 except that it uses a different web system for providing the moving channel shaped conveyor (see FIG. 11) in which foaming takes place in that its bottom comprises a single sheet 61 with upturned edge portions 62, its side walls being provided by sheets 63. The bottom sheet 61 is paper, usually kraft paper, which may be coated on its upper surface with a synthetic plastic coating to reduce absorption thereby of the expanding foam mix. The side sheets 63 may also be paper such as that used for the bottom sheet 61 but preferably they are thin sheets of polyethylene or some other transparent or translucent synthetic plastic material.

Referring now in more detail to the machine illustrated in FIGS. 8 to 10, it can be seen from FIG. 10 that the machine comprises a trough 64 to the bottom of which liquid foam mix is supplied, and from the open top of which partially expanded foam can flow over a weir or lip 65 on to inclined pour plate 66. The pour plate comprises four separate sections 67, 68, 69, 70 each hingedly connected to each other at 67', 68' and 69'. Each pour plate section is movable vertically relative to its adjacent section by means of respective screw jacks 67a, 68a, 69a and 70a to adjust or alter the longitudinal cross sectional shape of the pour plate 66, its length and/or its angle of inclination to the horizontal. Rigid side walls 71A; 71B are positioned on each side of the pour plate 66 and spaced from the adjacent edge thereof by a small distance D, (the thickness of a side sheet 63 i.e. between 5 and 10 mm). As can be clearly seen from FIG. 10, the pour plate 66 extends downwardly from the trough 64 until it reaches a driven conveyor 72, the conveying reach of which travels horizontally. This conveyor is of known type and comprises a series of rigid slats 73 which travel over a horizontal support platen (not shown). Driven side conveyors 75 are provided on each side of the horizontal conveyor 72, these side conveyors being of similar known type to the horizontal bottom conveyor 72 and extending downstream of the free end 74 of the pour plate for approximately 15 metres. In order to ensure a smooth transition from the downwardly inclined pour plate 66 on to the horizontally moving conveyor 72, the downstream pour plate section 74 is supported from below and extends over and is minimally spaced from the beginning of the horizontal conveying reach of the conveyor 72 (see FIG. 10).

The construction of the pour plate assembly will now be described in more detail with particular reference to FIG. 9. In order that the width of the foam block being produced can be increased during a production run, it will be appreciated that it is necessary to be able to increase the width of the pour plate 66, and simultaneously to move outwardly the side walls 71A, 71B and the side conveyors 75 by a corresponding amount. To enable this width adjustment to be made, the pour plate is assembled in three parts in much the same way as that of the FIGS. 1 to 7 embodiment in that it includes a fixed immovable central section 76 which rests on laterally movable edge sections 77, 78, 79 and 80. Each pour plate edge section is supported by its respective screw jack 67a–70a or a support structure (not shown) which is mounted on a carriage 82 having wheels 83 which run along rails 84.

The carriage 82 also supports the side walls 71A and 71B so that they are fixed relative to the pour plate sections 67-70 so as to be spaced therefrom by the distance D each side wall 71A, 71B being mounted on a catwalk assembly 85, itself supported by struts 86 on the carriage 82. The catwalk serves as a support for side sheet supply rolls 87, the bottom spindle of each of which is mounted in a bearing (not shown) mounted on the catwalk 85, the top spindle being located in a bearing in a location arm 88.

A guide roller 89 is provided on the end of each side wall 71A, 71B to guide the side sheet 63 supplied from the supply roll 87 in a manner to be described shortly. Known Foxwell guide rolls 90 are mounted on each side wall 71A, 71B adjacent its respective guide rollers 89 to keep the side sheets 63 supplied from their respective supply rolls 87 upright against the side walls 71A, 71B during operation.

As can be seen more clearly from FIG. 9, the carriages 82 are movable towards or away from each other in the direction of arrow A, by means of one or more screw jacks 91 operatively connecting the two carriages 82 and acting therebetween. It will be seen from the foregoing, that if it is desired to increase the width of the pour plate 66, operation of the screw jack or jacks 91 will laterally move the carriages 82 away from each other together with the whole assembly supported thereon, namely the pour plate edge sections 77, 78, 79 and 80, the side walls 71A, 71B, the catwalks 85 and the side sheet supply rolls 87. The central section 76 of the pour plate is prevented from longitudinal or lateral movement relative to the movable pour plate edge sections 77-80 by means of a suitable support structure only part 93 of which is shown so the pour plate edge sections are able to slide laterally with respect to said fixed central section 76 upon actuation of the or each screw jack 91.

The trough 64 is similar to that shown in FIG. 5 in that it is provided with a pair of movable partitions or dams 94 each of which has a nose 95 which extends forwardly of the trough 64 up to a position just upstream of the end of the fixed side walls 71A, 71B. If necessary, additional dams may be provided in the free space 96 between the dams 94 and the sides of the trough for reasons which will be explained shortly. The dams are a press fit in the trough 64 and make a seal therewith so that the liquid foam mix expanding and rising in the trough 64 and contained between the dams 94 cannot seep out into the free space 96 on either side thereof. The trough 64 is mounted on a support assembly (not shown) which retains it in a fixed position in relation to the head of the pour plate 66. However, the trough is movable in a vertical direction by means of screw jack 97 so that it can maintain its position relative to the head of the pour plate 66 irrespective of any vertical movement thereof to alter the profile of the pour plate. The liquid foam reactants are supplied to the bottom of the trough from a static mixing head 98 via supply line 99.

The bottom sheet 61 is supplied from a supply roll 100, the width of said sheet 61 being greater than the maximum width of foam block to be produced. The supply roll 100 is supported in a support structure 101 which is mounted on a carriage 102 provided with wheels 103 which run on rails 104. The carriage 102 is connected by means of a slave arm 105 to one of the carriages 82 carrying the pour plate 66 (in the illustrated embodiment, it is connected to the right hand carriage when looking downstream of the trough 64 but it could be connected to the other left hand carriage 82 instead if required).

A knife 106 is located below the part of the bottom sheet 61 fed from its supply roll 100 so that said bottom sheet 61 can be cut to the desire width required for the width of foam block being manufactured. The knife 106 is mounted for lateral movement with respect to the supply roll 100, i.e. along its length, and is movable therealong by means of a screw jack 107. It will be appreciated that this adjustable knife arrangement 106 enables any width of bottom sheet 61 to be supplied to the head of the pour plate so width adjustments can be made during a production run by moving the knife 106 outwardly toward the end 108 of the roll 106. The cut-off part of the bottom sheet 61 which lies between the blade 106 and the end 108 of the supply roll 100 is taken up on a take up roll 109 so that the width of the bottom sheet which arrives at the head of the pour plate 66 having passed around guide roller 110 is correct for the width of foam block being manufactured.

The apparatus just described operates in the following manner:

First of all the side conveyors 75, the pour plate 66 and the side walls 71A and 71B on each side of the pour plate 66, all of which are operably connected so as to be adjustable in synchronism are set to the narrowest width of foam block to be produced during a production run.

If necessary the pour plate profile is the adjusted to suit the foam mix being used, its throughput and the width, shape and height of the foam block to be produced. This adjustment is achieved by means of the screw jacks 67a-70a.

The supply roll 100 for the bottom sheet is then positioned relative to the head of the pour plate 66 so that its edge 111 is approximately 7.5 cms (3 inches) beyond the inside face of the side wall 71A, and the knife 106 is moved to a position where it is approximately 7.5 cms (3 inches) beyond the inside face of the side wall 71B. As the take up roll 109 is operatively connected to the knife assembly 106 to move in synchronism therewith, movement of the knife 106 results in a corresponding movement of the take up roll 109.

The dams 94 in the trough 64 are then set to a position in which they are spaced apart by a distance no wider than the width of the pour plate 66 but preferably inwardly of the side walls 71A and 71B as illustrated.

The machine is now ready to run so the bottom sheet 61 is fed from its supply roll 100, round the guide roller 110, upwardly over free end or head 113 of the pour plate 66, down the pour plate 66 and along the horizontal conveyor 72. It will be seen that when the horizontal conveyor is driven in the direction of arrow B, the bottom sheet 61 will continuously be unwound from its supply roll 100 and fed downstream of the trough 64. The side sheets 63 are then fed from their respective supply rolls 87 round the guide rollers 89 and along the inside face of the side walls 71A, 71B in the gap D between said side walls and the free edge of the pour plate 66. Adjacent the end 74 of the pour plate, they contact the driven side conveyors 75 and it will be understood that when the side conveyors 75 are moving in the direction of arrow C, the side sheets 63 will be continuously unwound from their supply rolls 87 and transported downstream of the trough 64.

Because the trough 64 is spaced upstream of the point where the side sheets 63 meet the bottom sheet 61 to form the moving channel shaped conveyor by the distance X (see FIG. 8) which is usually between 12 inches and 18 inches, the end face of each side wall 71A, 71B can be used as a constriction or folding quadrant to turn up the side edges of the bottom sheet 61 to form the upturned edge portions 62 (see FIG. 11) on the bottom paper 61 as it travels from the pour plate head 113 to the side walls 71A, 71B. Thus, a pressure seal is formed where the upturned edge portions 62 of the bottom sheet 62 meet with the side sheets 63 and a moving open topped channel shaped mould is provided which then travels down the pour plate 66 and then horizontally over the conveyor 72.

Partially expanded foam flowing out of the trough 64 over the weir 65 is contained between the dam noses 95 until it reaches the end of said noses when it spreads or fans out laterally in the shape illustrated in FIG. 8 until it reaches the side sheets 63, by which time the edge seal between the side sheets 63 and the bottom sheet has been formed so there is no risk of foam mix leaking past the edge seal of the moving conveyor channel and contaminating the pour plate.

Having formed the upstanding edge portions 62 on the bottom sheet 61 and made a pressure seal with the side sheets 63, the height of these upstanding edges 62 is maintained generally constant all the time that the bottom sheet travels down the pour plate 66. If the bottom sheet has to travel down a pour plate whose sections 67-70 are inclined at different angles to each other as illustrated in FIG. 10, the height of the upstanding edge portions 62 can still be maintained generally constant due to the paper wrinkling or pleating as it crosses the junction between adjacent differently inclined pour plate sections.

In known manner, once the partially expanded foam leaves the trough 64, it is transported away from the trough in the moving channel shaped conveyor 61,63 while it completes its expansion process to form a continuous length of foam block, which has a flat upper surface due to the length and angle of inclination of the pour plate.

In order to alter the width of the foam block being produced without stopping the production run, the side walls 71A, 71B, the side conveyors 75 and the pour plate 66 are all moved outwardly in synchronism to the desired increased width.

While the pour plate 66 is increasing in width, the supply roll 100 simultaneously follows the movement of the carriage 82 supporting side wall 71B with the result that the position of the edge 111 relative to the inside face of side wall 71A remains unaltered during width change movements in that it is always located approximately 7.5 cm (3 inches) beyond the inside face of the side wall 71A.

Either while this movement is taking place or shortly thereafter, the blade 106 and the take up roll 109 are moved outwardly to their new positions where the edge 112 is located beyond the inner face of side wall 71B by approximately 7.5 cm (3 inches) as before.

During width changes, it is essential that the seal between bottom sheet 61 and the side sheets 63 be maintained at all times otherwise expanding foam mix will seep through onto the pour plate and contaminate it with the result that the bottom sheet 61 is likely to tear as it is no longer able to slide smoothly over the pour plate.

With the apparatus illustrated, the upstanding edge region 62 of the bottom sheet 61 adjacent wall 71A remains unaltered from its preset height of approximately 3 inches at all times during width changes due to the location of the edge 111 of the bottom paper remaining fixed relative to the inside face of side wall 71B so the seal between edge 111 and its associated side sheet 63 is unaffected by width adjustments to the pour plate 66. However, in order to maintain the seal between edge 112 of the bottom sheet and its respective side sheet 63 and at the same time to increase the effective width of bottom sheet 61 in accordance with the width adjustments being made to the pour plate 66, the upstanding edge region 62 of the bottom sheet 61 adjacent side wall 71B is folded or rolled down onto the pour plate 66 while being maintained in contact with the side sheet 63 to form a seal therewith under the weight of the expanding foam.

If the width of the block is to be increased by, for instance 4", (2 inches each side) then a separate tape 4" wide would be attached to the edge 112 of the bottom sheet by means (not shown) just before or as the width adjustment commences. Thus, the upstanding edge region of the bottom sheet during the width change, or at least initially, wll be 7 inches high although this will be reduced as the width of the pour plate is increased and this upstanding edge region is rolled down to correspondingly increase the width of the bottom sheet 61 while still maintaining its seal with the side sheet 63.

It will be noted that with the arrangement illustrated, in which carriage 102 is connected to one of the carriages 82 by the slave arm 105 it is only necessary to trim the one edge 112 with a single knife 106 during a width change because the edge 111 is always maintained in its correct position in relation to the side wall 71A irrespective of movement thereof. However, for reasons to be explained shortly, if desired, the roll 100 may be located centrally with respect to the side walls 71A and 71B and a pair of knives 106 provided, both of which are simultaneously moved outwardly during a width change to their new position in which edges 111 and 112 are approximately 7.5 cm (3 inches) outside the inside faces of side walls 71A and 71B.

Having adjusted the width of the pour plate 66 to its new increased width, and altered the position of the knife 106, the dams 94 are then moved outwardly by a corresponding amount. This can be done either by pivoting each dam about its bottom edge resting on the bottom of the trough 64 or additional dams can be fitted into the space 96 in the required new location for the increased width and when in position, the original dams 94 at the original width can be removed.

If a width adjustment of more than 4 inches or 6 inches has to be made, it may be necessary to arrange for the roll 100 to be immovably located centrally of the pour plate and to provide a pair of blades 106 which are movable along the length of the roll 100 to trim the edges 111 and 112 thereof so that the bottom sheet 61 is of the desired width for the width of foam being produced by the time it reaches the pour plate head 113. With such an arrangement, if for instance a width increase of 8 inches is required, a 4 inch strip of material, preferably adhesive tape, would be attached by means (not shown) to each edge 111 and 112 just before the width change operation commenced so that the upstanding edge regions 62 of the bottom sheet 61 are thereby increased to approximately 7 inches on each side of the pour plate 66. Thus there is plenty of material at each edge of the bottom sheet to be rolled down to increase its width on each side by 4 inches while still maintaining the seal with the side sheets 63. Once the pour plate 66, the side walls 71A, 71B and the side conveyors 75 have reached their new width position, the pair of blades 106 can be moved to their new positions and the feed for the additional tape applied to edges 111 and 112 disconnected. The apparatus is then set up and running to the new width requirement.

Although it is preferred to use a paper bottom sheet 61 coated with a synthetic plastic covering layer, if desired, thin polyethylene sheet or some other synthetic plastic material may be used. Depending on the thickness of the polyethylene sheeting used, it may be necessary to drive the sheeting over the pour plate 66 to avoid undue stretching thereof in which case the pour plate would comprise a series of driven conveyors or free running or driven rollers. As polyethylene side sheets 63 are used, if the fixed side walls are also made of a transparent material, it is possible to see what is happening within the rising foam on the pour plate 66 so if cracks or voids are seen to be developing, remedial steps can be taken promptly.

Instead of driving the side sheets 63 by means of the side conveyors 75 or the horizontal conveyor 72, the side walls 71A and 71B can be replaced by conveyors and the side conveyors 75 can be replaced by fixed walls. If desired, the side conveyors 75 or those on each side of the pour plate (if such conveyors are used) may be heated.

For certain applications, paper instead of polyethylene side sheets may be used.

As an example, if the central section 76 of the pour plate is 48 inches wide and the trough 64 is 96 inches long, it is possible to make foam from 48 inches up to 96 inches wide, adjustments in width up to a maximum of 24 inches each side being possible without stopping the production run. In practice however, it would be usual to increase the width in small increments of say between 4 inches and 6 inches.

We claim:

1. Apparatus for producing a continuous strand of polymeric foam from a mixture of liquid foam reactants, comprising
    (a) a trough in which the liquid foam reactants may expand upwardly;
    (b) means operatively assrested with said trough for supplying liquid foam reactants to the bottom of said trough;
    (c) weir means arranged adjacent the upper portion of said trough for receicing in overflowing relation the foam that rises by expansion in said trough;
    (d) open-topped channel shaped conveyor means for continuously conveying expanding foam away from said weir means while the foam completes its expansion process, said open-topped channel shaped conveyor means comprising a bottom wall, and separate side walls which join and form a seal with said bottom wall downstream of the weir means;
    (e) guide means operably associated with the trough to keep partially expanding foam flowing over the weir means onto the bottom of the channel shaped conveyor out of contact with the side walls thereof until said seal between the bottom and side walls of said conveyor has been formed; and
    (f) conveyor width adjustment means operable to alter the width of the bottom of the channel shaped conveyor and to move its side walls correspondingly in synchronism with width alterations of said bottom while still maintaining the seal between the bottom and side walls of the channel shaped conveyor during width changes, whereby foam of varying widths may be produced without stopping the production run.

2. Apparatus as claimed in claim 1, wherein the bottom of the channel shaped conveyor is a single sheet of material, and further including folding means operatively associated with said conveyor for forming an upstanding lip on each edge of said bottom sheet as it travels from the said weir means to the point downstream thereof where the separate side walls sealingly merge with the bottom to provide said open-topped channel shaped conveyor, said conveyor width adjustment means being operable to increase the width of the channel shaped conveyor, whereby the side walls are moved outwardly and at least one of the upturned lips on the bottom sheet is folded down to increase the width of the bottom of the channel shaped conveyor and maintain the seal between said bottom sheet and the side sheets during a width changing operation.

3. Apparatus as claimed in claim 2, wherein both upturned lips are decreased in height during a width changing operation.

4. Apparatus as claimed in claim 3, and further including means operable to attach a separate strip of material to at least one edge of the bottom sheet before it reaches said weir means.

5. Apparatus as claimed in claim 1, wherein the length of the trough is greater than the maximum width of the foam to be produced by the apparatus, a pair of speed partitions being provided in the trough which are movable to vary the length thereof.

6. Apparatus as claimed in claim 5, wherein each partition has a nose portion which extends beyond said weir means downstream of the trough to provide said guide means.

7. Apparatus as claimed in claim 6, wherein each nose portion terminates upstream of the point where the moving side walls make said seal with the bottom sheet to form the open-topped channel shaped conveyor.

8. Apparatus as claimed in claim 2, wherein the bottom sheet is fed from a roll whose width is greater than the maximum width of the foam to be produced by the apparatus, the apparatus including cutting means operatively associated with said roll for cutting the sheet supplied from said roll so that when it arrives at said weir means, it is of a width corresponding with the width of foam being produced.

9. Apparatus as claimed in claim 1, and further including downwardly inclined pour plate means adjacent said weir means, said pour plate means including a fixed central section, and edge portions movable laterally relative to said control section, and movable carriage means operatively associated with said pour plate supporting each of said edge portions, respectively.

10. Apparatus as claimed in claim 9, and further including a rigid side wall spaced from each edge of the pour plate by a distance corresponding with the thickness of a side sheet, thereby to permit the easy passage of said side sheet therethrough, each rigid side wall and a supply roll for its respective side sheet also being mounted on said movable carriage means, respectively.

11. Apparatus as claimed in claim 10, and further including means connected between said carriages for displacing the same relative to each other in synchronism, thereby to adjust the width of the pour plate.

12. Apparatus as claimed in claim 9, and further including an additional carriage upon which the sheet supply roll is mounted, said additional carriage being movable laterally with respect to the trough, said additional carriage being operably connected with one of said pour plate carriages so as to move laterally in synchronism therewith.

13. Apparatus as claimed in claim 12, wherein the bottom sheet supply roll is mounted relative to the pour plate so that one edge of said roll extends laterally beyond one side edge of the pour plate by a distance corresponding to the amount of material required to form one of the upstanding lips on the bottom sheet.

14. Apparatus as claimed in claim 13, wherein said distance remains constant regardless of lateral movement of the pour plate carriages.

15. Apparatus as claimed in claim 8, wherein the cutting means is a blade movable along the length of the bottom sheet supply roll so that it can be positioned laterally beyond one or both side edges of the pour plate by a distance corresponding to the amount of material required to form the or each upstanding lip on the bottom sheet.

16. Apparatus as claimed in claim 10, wherein said folding means comprises the upstream end of each rigid side wall, each said side wall being positioned to fold to its respective side edge of the bottom sheet to form one of the upstanding lips thereon.

17. Apparatus as claimed in claim 38, and further including pour plate adjustment means for adjusting a physical characteristic of said pour plate.

18. Apparatus as claimed in claim 17, wherein said pour plate adjustment means comprises a plurality of hingedly connected pour plate sections, each section having means associated therewith for moving that section vertically relative to an adjacent section.

19. Apparatus as claimed in claim 1, wherein each side wall comprises a film of polyethylene.

20. Apparatus as claimed in claim 1, wherein said conveyor bottom comprises at least one paper sheet.

21. Apparatus as claimed in claim 20, wherein each paper sheet is coated with a layer of a synthetic plastic material.

* * * * *